United States Patent
Inukai et al.

(10) Patent No.: US 8,001,396 B2
(45) Date of Patent: Aug. 16, 2011

(54) FEEDBACK CONTROL DEVICE

(75) Inventors: Katsumi Inukai, Iwakura (JP);
Masahito Hamaya, Nagoya (JP)

(73) Assignee: Brother Kogyo Kabushiki Kaisha,
Nagoya-shi, Aichi-ken (JP)

( * ) Notice: Subject to any disclaimer, the term of this patent is extended or adjusted under 35 U.S.C. 154(b) by 436 days.

(21) Appl. No.: 12/179,737

(22) Filed: Jul. 25, 2008

(65) Prior Publication Data
US 2009/0027924 A1 Jan. 29, 2009

(30) Foreign Application Priority Data
Jul. 26, 2007 (JP) ................. 2007-194721

(51) Int. Cl.
*G06F 1/00* (2006.01)
(52) U.S. Cl. ........................ 713/300; 323/241
(58) Field of Classification Search .......... 323/222, 323/237, 327, 239, 282; 363/34–41, 89, 363/95, 97; 713/300, 301; 702/57, 76
See application file for complete search history.

(56) References Cited

U.S. PATENT DOCUMENTS

| 7,279,871 B2 * | 10/2007 | Pierson ............ 323/237 |
| 2004/0228374 A1 | 11/2004 | Inukai |
| 2007/0150767 A1 * | 6/2007 | Motomiya et al. ...... 713/300 |

FOREIGN PATENT DOCUMENTS

| JP | 04-015581 | * | 1/1992 |
| JP | 07-143749 | | 6/1995 |
| JP | 11-027949 | | 1/1999 |
| JP | 2000-333466 | * | 11/2000 |
| JP | 2003-169476 | | 6/2003 |
| JP | 2004-342655 | | 12/2004 |

OTHER PUBLICATIONS

Notification of Reason for Refusal Japanese Patent Application No. 2007-194721 mailed Sep. 8, 2009.

Office Action received for corresponding Japanese application 2007-194721 mailed Mar. 10, 2009.

* cited by examiner

*Primary Examiner* — Rajnikant B Patel
(74) *Attorney, Agent, or Firm* — Banner & Witcoff, Ltd.

(57) ABSTRACT

A feedback control device is provided. The feedback control device includes a controlled-system which outputs an output in correspondence with a control signal; a feedback signal generating member which generates a feedback signal as the output of the controlled-system; a reference signal unit which outputs a reference control signal to the controlled-system; and a determination unit which determines a version of the controlled-system on the basis of the feedback signal generated by the feedback signal generating member when the reference signal unit outputs the reference control signal to the controlled-system.

11 Claims, 11 Drawing Sheets

FEEDBACK CONTROL DEVICE

CROSS REFERENCE TO RELATED APPLICATION

The present application claims priority from Japanese Patent Application No. 2007-194721, which was filed on Jul. 26, 2007, the disclosure of which is herein incorporated by reference in its entirety.

TECHNICAL FIELD

Apparatuses and devices consistent with the present invention relate to feedback control devices and, more specifically, to feedback control devices capable of determining a version of the controlled-system.

BACKGROUND

Japanese unexamined patent application publication No. JP-A-H11-27949 describes a related art feedback control device. In the related art feedback control device, a parameter of a feedback control is required to be changed in accordance with a version of a controlled-system in some cases. For example, in the related art feedback control device in which an inverter device is used as the controlled-system, version information is transmitted from the inverter device to an external control device by communication.

SUMMARY

However, when the version of the controlled-system is determined by communication in this way, a communication unit such as a communication port has to be further provided, thereby complicating its configuration. Accordingly, an object of the invention is to provide a feedback control device that has a simple configuration and is capable of determining a version of the controlled-system.

According to an illustrative aspect of the present invention, there is provided a feedback control device comprising a controlled-system which outputs an output in correspondence with a control signal that is input to the controlled-system; a feedback signal generating member which generates a feedback signal as the output of the controlled-system; a reference signal unit which outputs a reference control signal to the controlled-system; and a determination unit which determines a version of the controlled-system on the basis of the feedback signal generated by the feedback signal generating member when the reference signal unit outputs the reference control signal to the controlled-system.

According to another illustrative aspect of the present invention, there is provided a feedback control device comprising a high voltage board comprising a high voltage power supply circuit which generates a high voltage output; a feedback signal generating circuit which generates a feedback signal; and a driving voltage control circuit which controls the high voltage output based on a control signal; and a control board comprising a pulse width modulation (PWM) circuit which outputs a PWM signal as the control signal; an analog-to-digital circuit which receives the feedback signal; and a determination unit which determines a version of the high voltage board in accordance with the feedback signal.

According to another illustrative aspect of the present invention, there is provided a method of determining a version of controlled-system, the controlled-system being configurable into a first version comprising a first feedback circuit which outputs a first feedback signal, or a second version comprising a second feedback circuit which outputs a second feedback signal, the method comprising outputting a control signal to the controlled-system; in response to the control signal, receiving either the first feedback signal or the second feedback signal from the controlled-system; determining a version of the controlled-system based on whether the response is the first feedback signal or the second feedback signal; and controlling the controlled-system based on the version of the controlled-system.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS

First Exemplary Embodiment

Figure 1:
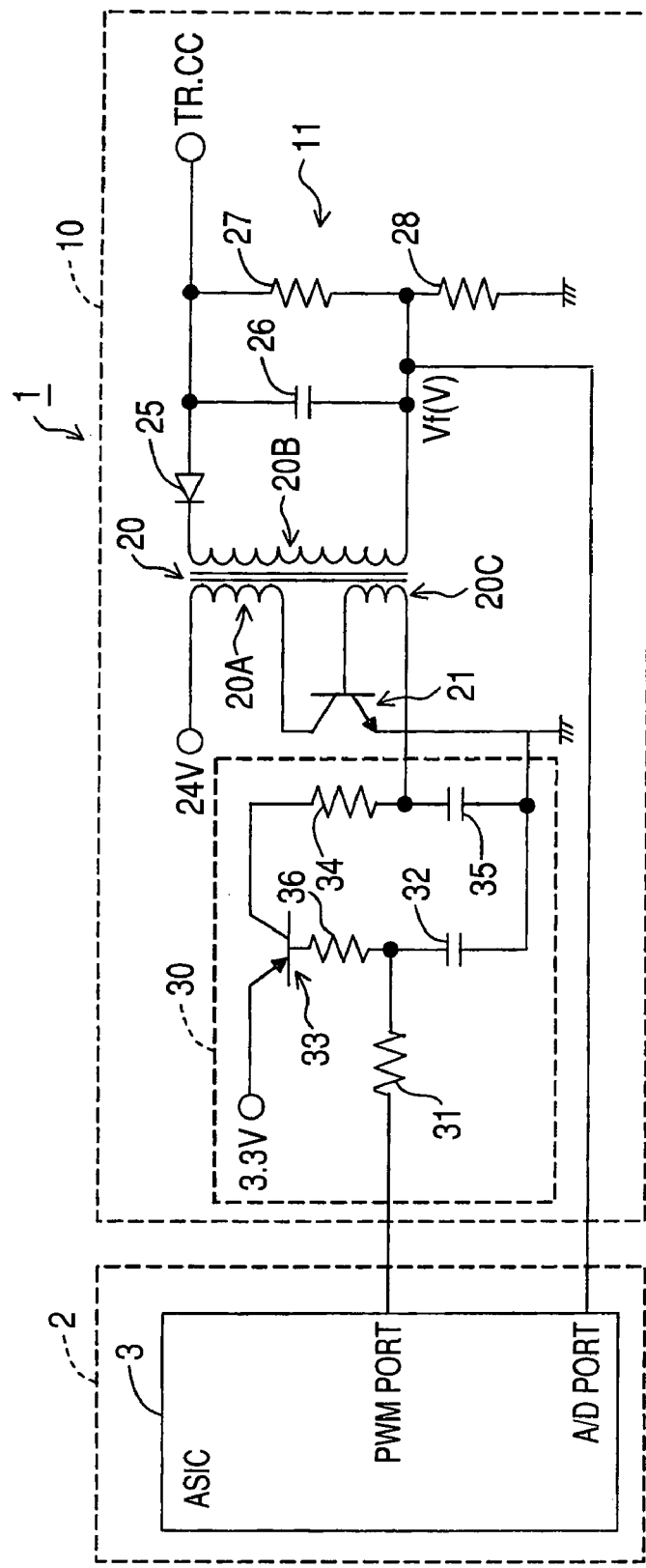
FIG. 1 is a circuit diagram illustrating a configuration of a power supply unit of a first version according to each exemplary embodiment.
Figure 2:
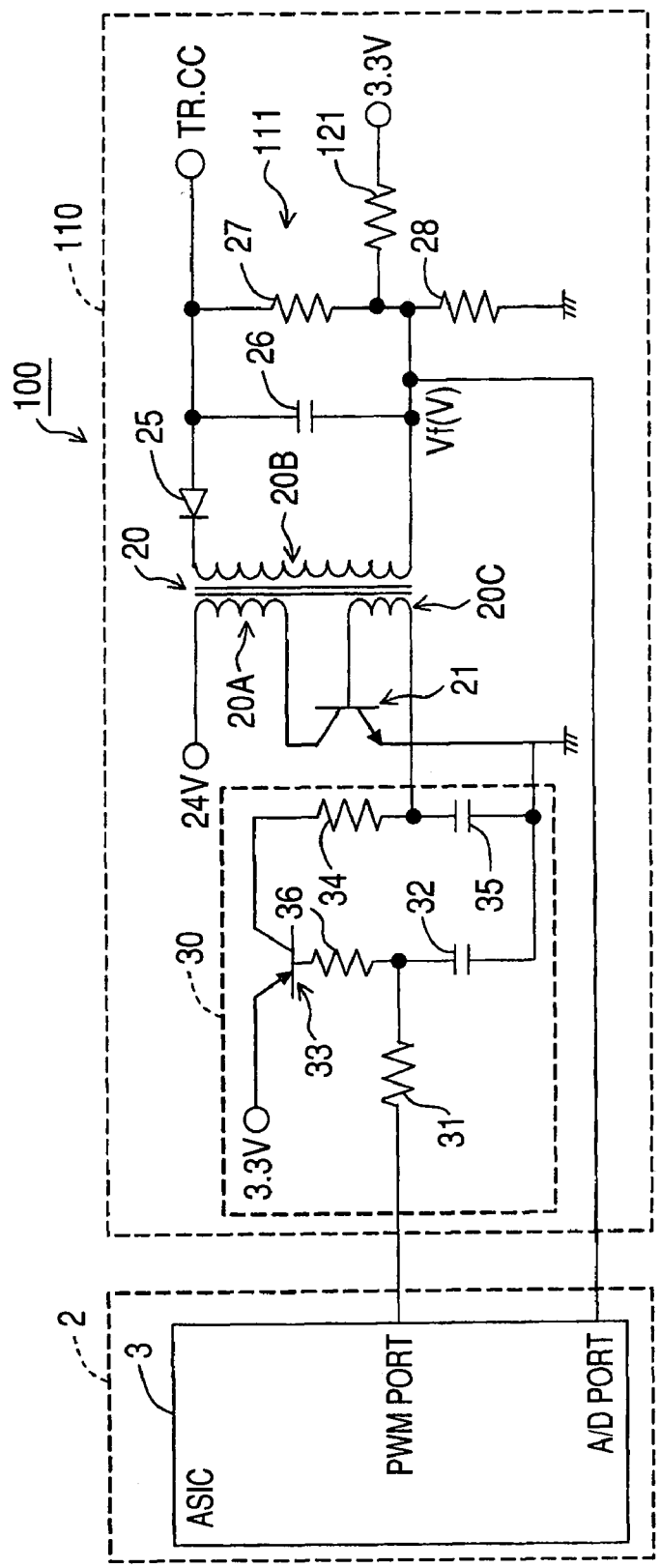
FIG. 2 is a circuit diagram illustrating a configuration of a power supply unit of a second version according to a first exemplary embodiment of the invention.

Exemplary embodiments of the present invention will be described with reference to the drawings. FIGS. 1 and 2 are circuit diagrams illustrating configurations of power supply devices 1 and 100 as a feedback control device according to the invention, respectively. The power supply devices 1 and 100 generate transfer bias current TR.CC of a device such as, e.g., a laser printer (not shown). The power supply device 1 includes a high-voltage power supply circuit 11 of a first version according to each exemplary embodiment. The power supply device 100 includes a high-voltage power supply circuit 111 of a second version according to a first exemplary embodiment of the invention.

That is, the power supply device 1 includes a control board 2 and a high-voltage board 10. The high-voltage board 10 is an example of a controlled-system and a power supply device. The power supply device 100 includes the control board 2, which is the same as that of the power supply device 1, and a high-voltage board 110 as an example of the controlled-system and the power supply device. An Application Specific Integrated Circuit (ASIC) 3 including a central processing unit (CPU), a read only memory (ROM), a random access memory (RAM), etc. therein is provided in the control board 2. The high-voltage power supply circuit 11 of the first version and the high-voltage power supply circuit 111 of the second version are provided on the high-voltage board 10 and the high-voltage board 110, respectively.

First, a configuration of the high-voltage power supply circuit 11 of the power supply device 1 will be described. As shown in FIG. 1, the high-voltage power supply circuit 11 includes a self-excitation transformer 20 in which an energy accumulated in a primary winding 20A by application of a 24 V DC power supply is transmitted to a secondary winding 20B by a back electromotive force, a transistor 21 which switches current to the primary winding 20A, and a driving voltage control unit 30 which controls base current of the transistor 21. An auxiliary winding 20C of the transformer 20 is provided between a base of the transistor 21 and the driving voltage control unit 30. The voltage generated in the secondary winding 20B is controlled in accordance with the output voltage of the driving voltage control unit 30 in the following manner.

That is, when voltage is output from the driving voltage control unit 30 and base current flows to the transistor 21 through the auxiliary winding 20C, the transistor 21 is turned on, collector current flows from the 24 V DC power supply through the primary winding 20A, and magnetic flux of the transformer 20 increases. Since the collector current does not have a value equal to or more than an upper-limit value obtained by amplifying a current value of base current by gain of the transistor 21, the collector current of the transistor 21 is saturated. Then, the increase in the magnetic flux supplied from the primary winding 20A is lost, electric potential between both ends of the auxiliary winding 20C decreases, the base current of the transistor 21 decreases, and thus the transistor 21 is suddenly turned off. At this time, the energy accumulated in the transformer 20 is transmitted to the secondary winding 20B by the back electromotive force of the transformer 20, the voltage increases, and thus the voltage is generated in the secondary winding 20B.

A rectification diode 25 is coupled in series to the secondary winding 20B, and a smoothing capacitor 26 and a discharging resistor 27 are coupled to the both ends of a series circuit comprising the secondary winding 20B and the diode 25. The transfer bias current TR.CC is applied from a high-voltage side of the secondary winding 20B. A low-voltage side of the secondary winding 20B is grounded through a resistor 28, and the voltage of the low-voltage side as a feedback voltage Vf, which is an example of a feedback signal, is input to an analog to digital (A/D) port of the ASIC 3. That is, the resistor 28 corresponds to a feedback signal generating member.

On the other hand, the driving voltage control unit 30 includes a series circuit in which the output from a pulse width modulation (PWM) port of the ASIC 3 is grounded via a resistor 31 and a capacitor 32 and a transistor 33 in which the voltage between the resistor 31 and the capacitor 32 is applied to a base of the transistor 33 through a resistor 36. The PWM port is an example of a reference signal unit. An emitter of the transistor 33 is coupled to a 3.3 V DC power supply and a collector thereof is grounded via a resistor 34 and a capacitor 35. In addition, the voltage between the resistor 34 and the capacitor 35 is input to auxiliary winding 20C described above.

With such a configuration, when a PWM signal is output from the PWM port of the ASIC 3, the voltage of the PWM signal is smoothed by the resistor 31 and the capacitor 32 and applied to the base of the transistor 33. When a duty ratio (hereinafter, referred to as PWMDUTY) of the PWM signal is 100%, the base voltage becomes about 3.3 V. Accordingly, the transistor 33 is not turned on, the output of the driving voltage control unit 30 becomes about 0 V, and thus the transfer bias current TR.CC also becomes about 0 μA. When the PWMDUTY is about 85%, the base voltage becomes about 2.7 V, the transistor 33 is turned on, and thus the transfer bias current TR.CC corresponding to the collector current is generated.

As shown in FIG. 2, the high-voltage power supply circuit 111 of the second version has a different configuration from that of the high-voltage power supply circuit 11 in that a 3.3 V DC power supply is coupled between the resistors 27 and 28 through a resistor 121 as an example of a second changing member and a property of the transformer 20 is slightly different. The remaining configurations are the same as in the high-voltage power supply circuit 11 of the first version shown in FIG. 1. In addition, in FIG. 2, the same reference numerals and signs used in FIG. 1 are given to elements which are the same as those of FIG. 1, and detailed description is omitted.

Figure 3:
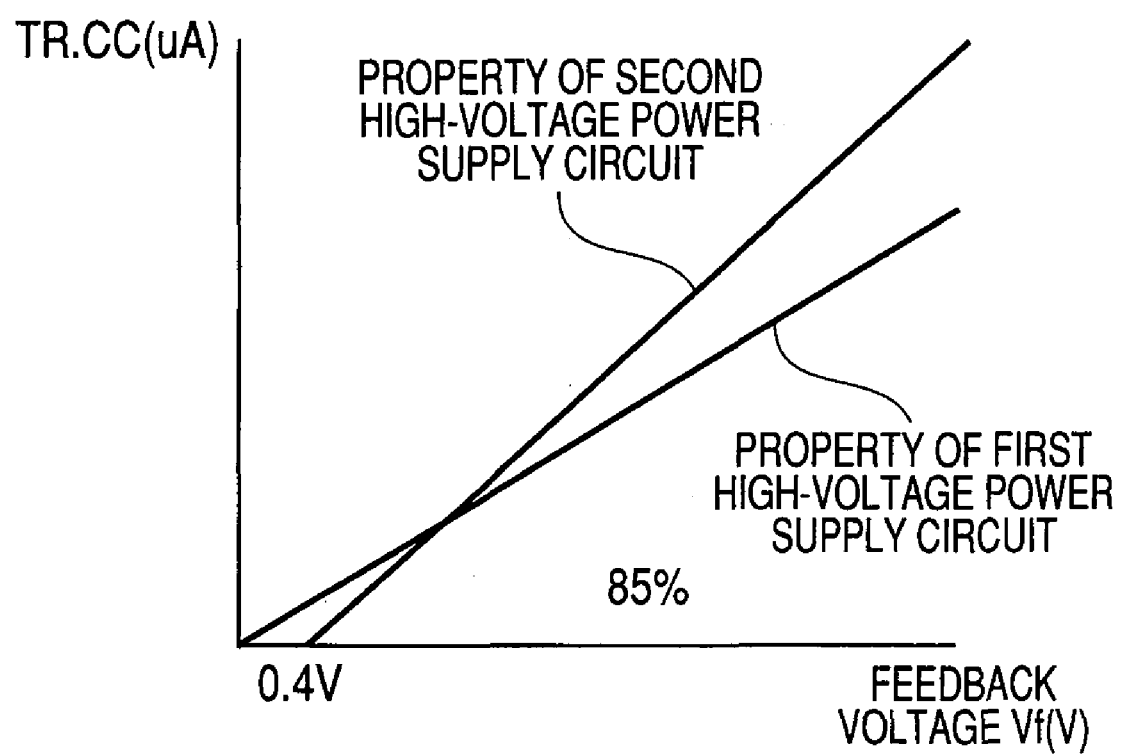
FIG. 3 is a graph illustrating a difference between the first version and the second version according to the first exemplary embodiment.

As shown in FIG. 3, in the high-voltage power supply circuit 11 of the first version, when the transfer bias current TR.CC is about 0 μA, the feedback voltage Vf is also 0 V. In contrast, in the high-voltage power supply circuit 111 of the second version, the feedback voltage Vf becomes about 0.4 V by the application of current through the resistors 121 and 28. Accordingly, the ASIC 3 determines a version of the high-voltage power supply circuit 11 or 111 coupled to the ASIC 3 in the following manner, and performs a feedback control process on the basis of the determination result.

Figure 4:
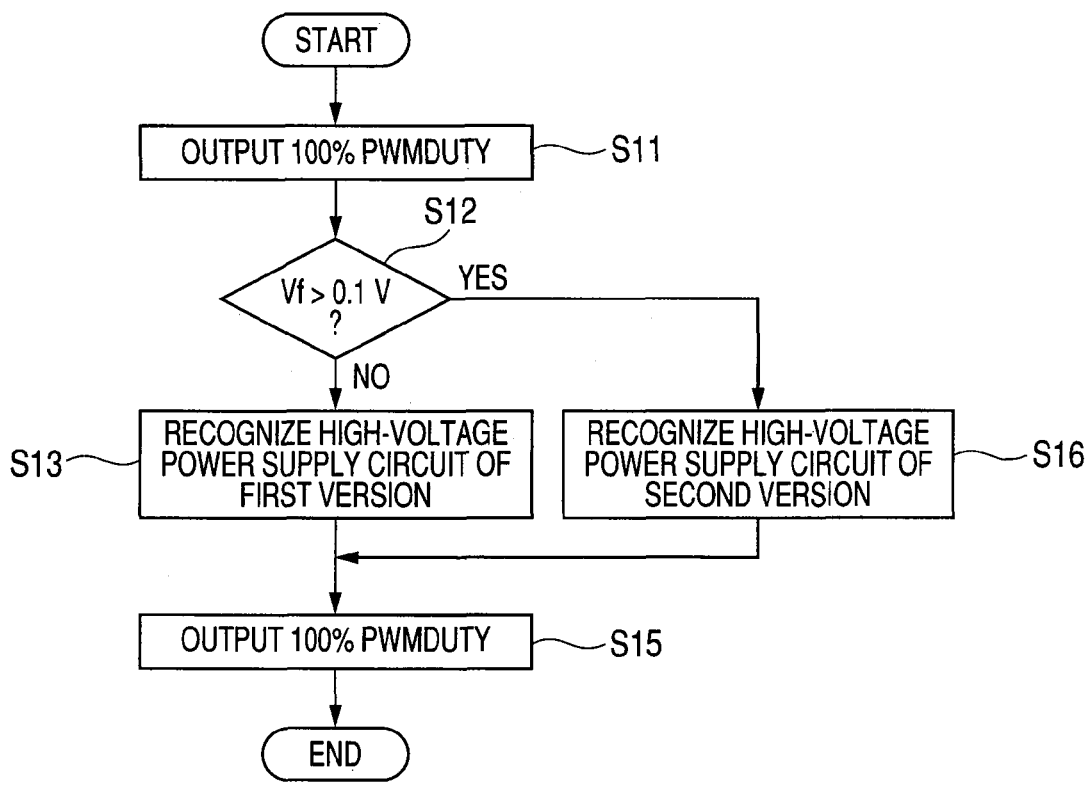
FIG. 4 is a flowchart illustrating a version determination process according to the first exemplary embodiment.

FIG. 4 is a flowchart illustrating a version determination process performed by the ASIC 3. As shown in FIG. 4, at operation S11, the PWM signal of a 100% PWMDUTY is output. Operation S11 is an example of inputting a reference signal. The PWM signal is an example of a reference control signal. In response to the PWM signal, as described above, the transfer bias current TR.CC becomes about 0 μA if a circuit coupled to the ASIC 3 is either the high-voltage power supply circuit 11 or 111. At operation S12, it is determined whether the feedback voltage Vf input to the A/D port exceeds about 0.1 V. If it is determined that the feedback voltage Vf≦about 0.1 V (S12: N), the process proceeds with operation S13. At operation S13, the circuit coupled to the ASIC 3 is identified as the high-voltage power supply circuit 11 of the first version, and the process proceeds to operation S15. In operation S15, the PWM signal of the 100% PWMDUTY is again output and the process ends for the moment. Then, the PWMDUTY is adjusted so as to have an appropriate value in accordance with the feedback control process described below.

Alternatively, if it is determined that the feedback voltage Vf>about 0.1 V (S12: Y), the process proceeds to operation S16. At operation S16, the circuit coupled to the ASIC 3 is identified as the high-voltage power supply circuit 111 of the second version, and the process proceeds with operation S15 described above.

Figure 5:
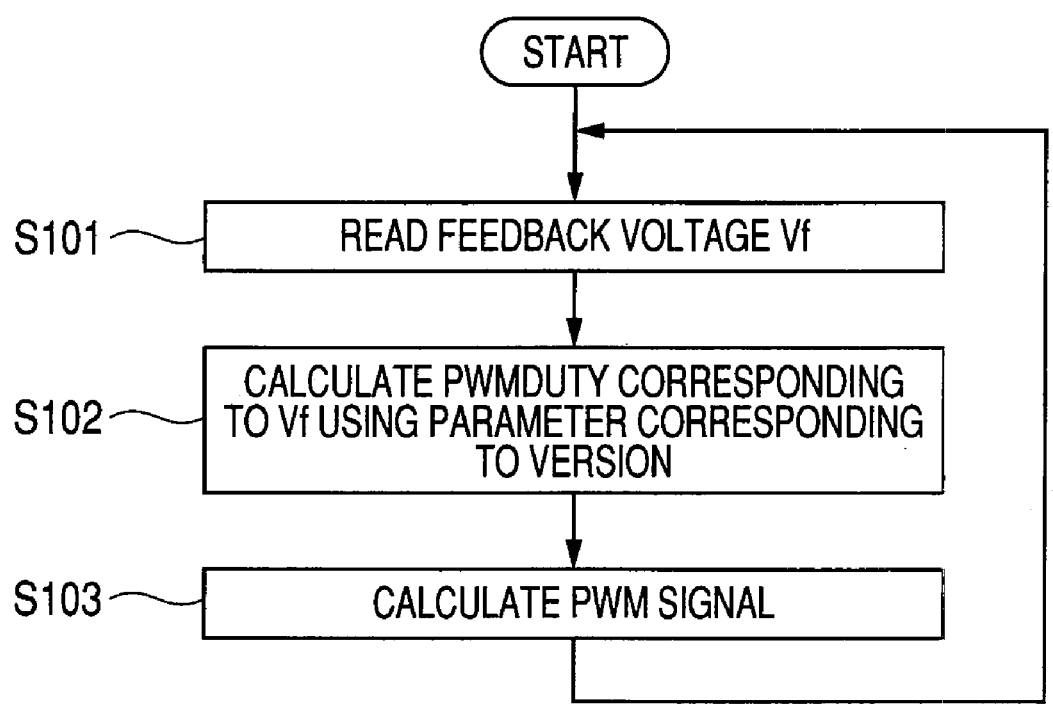
FIG. 5 is a flowchart illustrating a feedback control process according to each embodiment.

FIG. 5 is a flowchart illustrating the feedback control process as an example of the feedback control method performed by the ASIC 3 on the basis of the version determined in the version determination process. As shown in FIG. 5, at operation S101 of the process, the feedback voltage Vf input to the A/D port is first read. At operation S102, the PWMDUTY corresponding to the read feedback voltage Vf is calculated using a parameter corresponding to the version determined in accordance with the version determination process described above. At operation S103, the PWM signal of the PWM-DUTY is output to the driving voltage control unit 30, and the process returns to operation S101 described above. By repeating the controlling, it is possible to easily perform the feedback control process in consideration of the version of the high-voltage power supply circuit 11 or 111.

In the first exemplary embodiment of the invention, as described above, the version of the high-voltage power supply coupled to the ASIC 3 is determined (i.e., whether the circuit 11 or 111 is coupled to the ASIC 3) on the basis of the feedback voltage Vf upon outputting the PWM signal of the 100% PWMDUTY. Accordingly, the version can be determined without a complicated configuration, since it is not necessary to further provide a communication port or the like. Moreover, it is possible to further simplify the circuit configuration and easily manufacture the circuit since the version determination process described above can be performed depending on the configuration in which the resistor 121 is coupled to the 3.3 V DC power supply or not in the high-voltage power supply circuit 11 or 111. Furthermore, it is possible to suppress an influence of the version determining process on a configuration of other circuits in the high-voltage power supply circuit 11 or 111, since the output becomes about 0 μA upon outputting the PWM signal of the 100% PWMDUTY in either the high-voltage power supply circuit 11 of the first version or the high-voltage power supply 111 of the second version.

Second Exemplary Embodiment

Figure 6:
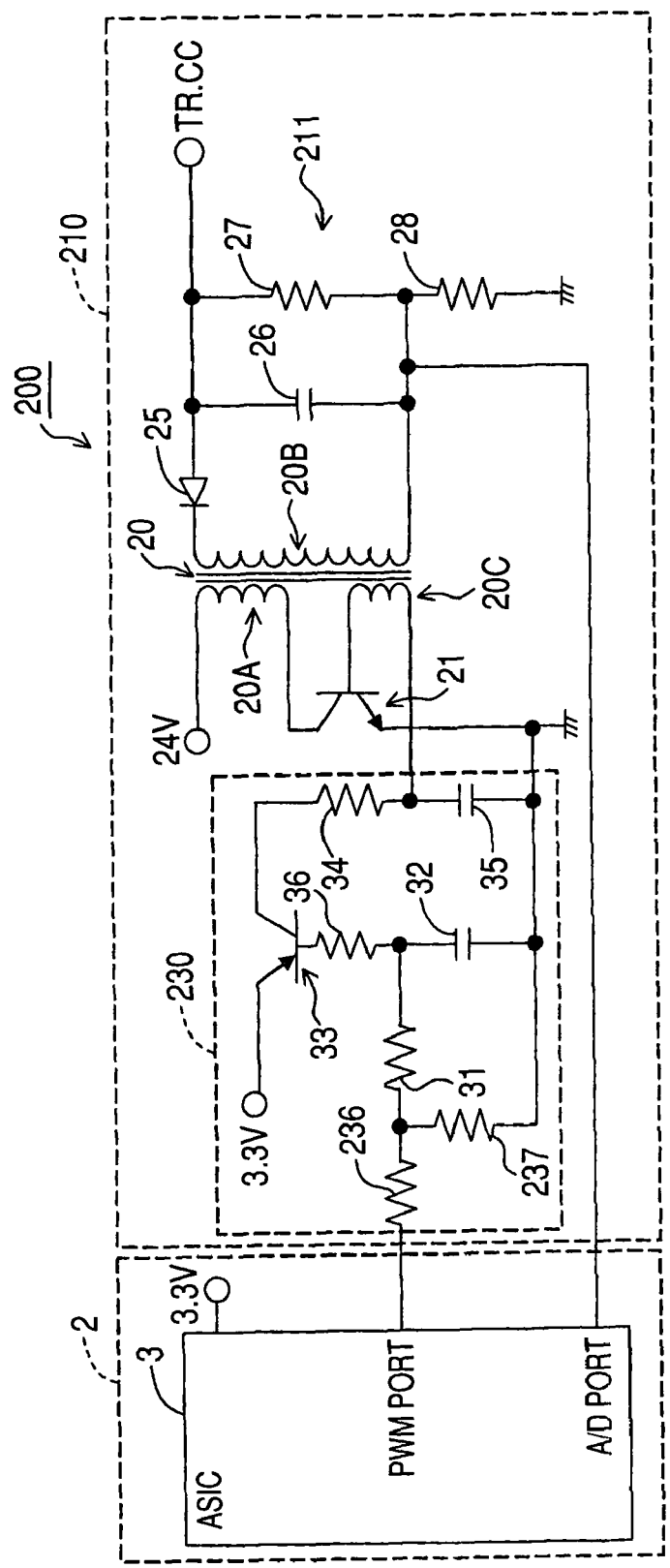
FIG. 6 is a circuit diagram illustrating a configuration of a power supply unit of a second version according to a second exemplary embodiment of the invention.

FIG. 6 is a circuit diagram illustrating a configuration of a power supply unit 200 in which a high-voltage power supply circuit 211 of a second version is provided with a high-voltage board 210 according to a second exemplary embodiment. As shown in FIG. 6, the high-voltage power supply circuit 211 of the second version has a configuration different from that of the high-voltage power supply circuit 11 of the first version in that the configuration of the driving voltage control unit 230 and a property of a transformer 20 are slightly different. However, the other configuration is the same. In the driving voltage control unit 230, resistors 236 and 237 are added as compared to the circuit 11 of FIG. 1. That is, an input PWM signal is grounded through resistors 236 and 237 as examples of a first changing member, and the voltage divided by the resistors 236 and 237 is applied to a base of a transistor 33 through the resistor 31 described above. In addition, in FIG. 6, the same reference numerals and signs used in FIG. 1 are given to elements which are the same as those of FIG. 1, and detailed description is omitted.

Figure 7:
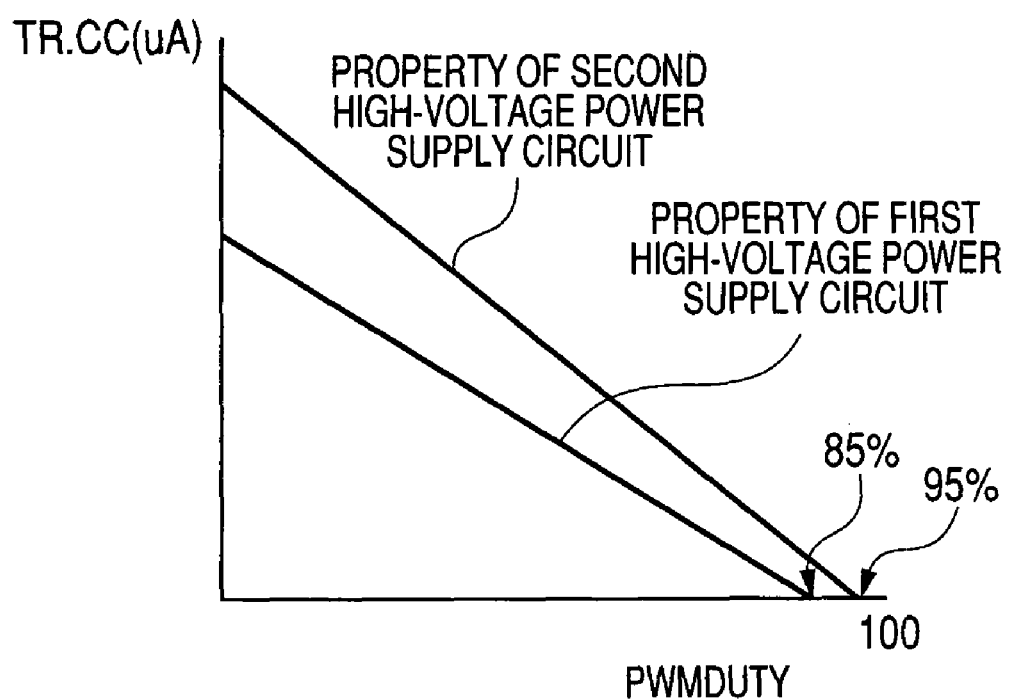
FIG. 7 is a graph illustrating a difference between the first version and the second version according to the second exemplary embodiment.

As shown in FIG. 7, in the high-voltage power supply circuit 11 of the first version, the transfer bias current TR.CC is not applied after ON of the transistor 33 as long as the PWMDUTY is not reduced up to about 85%. In contrast, in the high-voltage power supply circuit 211 of the second version, the transfer bias current TR.CC is applied when the PWMDUTY is reduced up to about 95%. Accordingly, the ASIC 3 determines a version of the high-voltage power supply circuit 11 or 211 coupled to the ASIC 3 in the following manner described in FIG. 8, and performs a feedback control process on the basis of the determination result.

Figure 8:
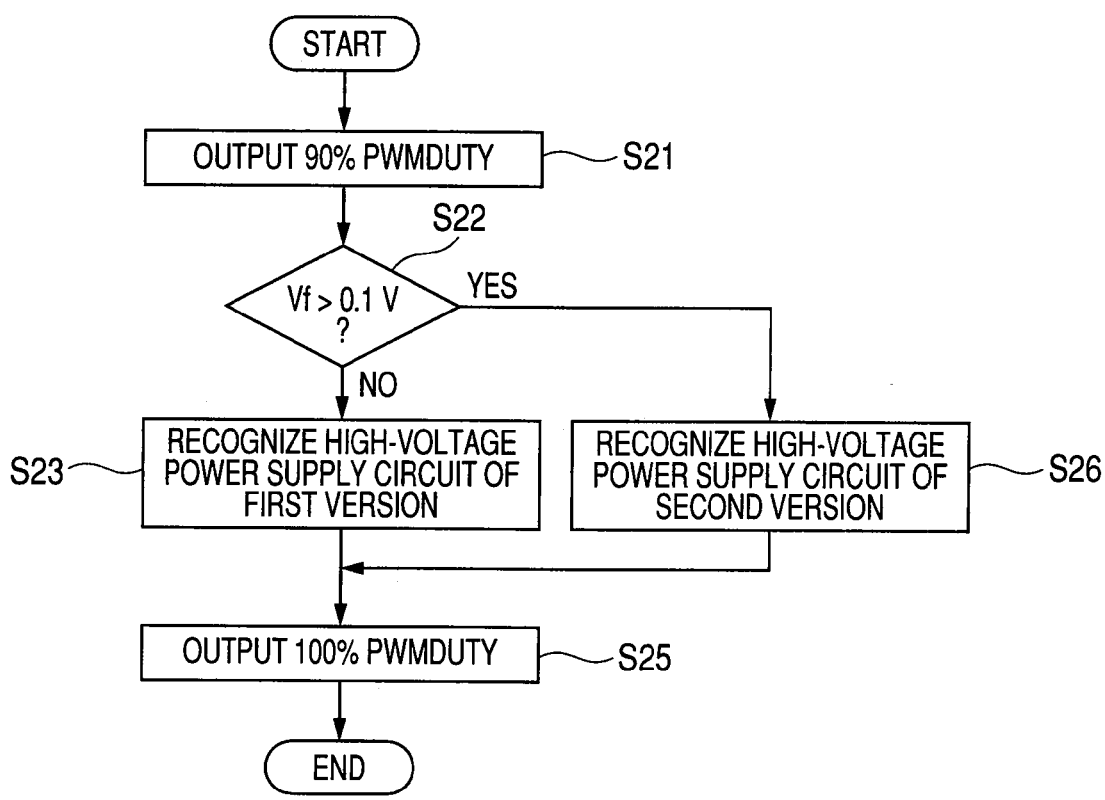
FIG. 8 is a flowchart illustrating a version determination process according to the second exemplary embodiment.

FIG. 8 is a flowchart illustrating a version determination process performed by the ASIC 3 according to the second exemplary embodiment. As shown in FIG. 8, at operation S21 of the version determination process, a PWM signal of a 90% PWMDUTY is output. In response to the PWM signal, the transfer bias current TR.CC is not output if the circuit coupled to the ASIC 3 is the high-voltage power supply circuit 11 of the first version. In contrast, the transfer bias current TR.CC is output if the circuit coupled to the ASIC 3 is the high-voltage power supply circuit 211 of the second version.

At operation S22, it is determined whether the feedback voltage Vf input to the A/D port exceeds about 0.1 V. If it is determined that the feedback voltage Vf≦about 0.1 V (S22: N), the circuit coupled to the ASIC 3 is identified as the high-voltage power supply circuit 11 of the first version in operation S23, and the process proceeds to operation S25. At operation S25, the PWM signal of the 100% PWMDUTY is again output and the process ends for the moment. Then, the PWMDUTY is adjusted so as to have an appropriate value in accordance with the feedback control process described above.

Alternatively, if it is determined that the feedback voltage Vf>about 0.1 V (S22: Y), the circuit coupled to the ASIC 3 is identified as the high-voltage power supply circuit 211 of the second version at operation S26, and the process proceeds to operation S25 described above.

In the second exemplary embodiment, the version of the high-voltage power supply circuit 11 or 211 is determined on the basis of the feedback voltage Vf upon outputting the PWM signal of the 90% PWMDUTY. Accordingly, the version can be determined without a complicated configuration, since it is not necessary to further provide a communication port or the like. Moreover, it is possible to further simplify the circuit configuration and easily manufacture the circuit since the version determination process described above can be performed depending on the configuration in which the resistors 236 and 237 are provided or not in the high-voltage power supply circuit 11 or 211. Furthermore, it is possible to suppress an influence of the version determination process on a configuration of other circuits of the high-voltage power supply circuit 11 or 211, since the output becomes about 0 μA upon outputting the PWM signal of the 90% PWMDUTY in the high-voltage power supply circuit 11 and the output is very small even in the high-voltage power supply 211, as shown in FIG. 7.

Third Exemplary Embodiment

Figure 9:
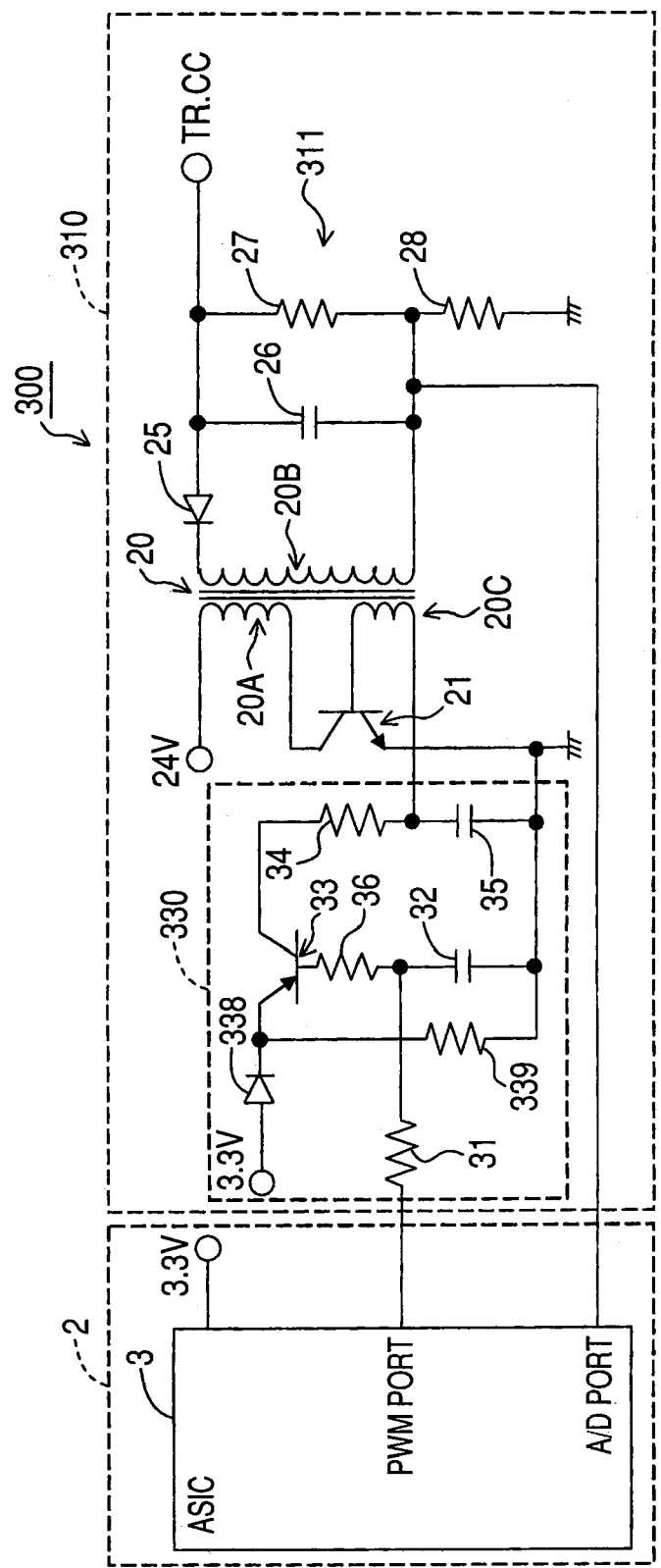
FIG. 9 is a circuit diagram illustrating a configuration of a power supply unit of a second version according to a third exemplary embodiment of the invention.

FIG. 9 is a circuit diagram illustrating a configuration of a power supply unit 300 in which a high-voltage power supply circuit 311 of a second version is provided with a high-voltage board 310 according to a third exemplary embodiment of the present invention. As shown in FIG. 9, the high-voltage power supply circuit 311 of the second version has a configuration different from that of the high-voltage power supply circuit 11 in that the configuration of the driving voltage control unit 330 and a property of a transformer 20 are slightly different. However, the other configuration is the same as in the high-voltage power supply circuit 111 of FIG. 2. In the driving voltage control unit 330, a diode 338 and resistor 339 are additionally provided. That is, a 3.3 V DC power supply is coupled to an emitter of a transistor 33 through the diode 338, and the emitter is grounded through a resistor 339. Accordingly, the low voltage is decreased by an amount of voltage drop (about 0.6 V) of the diode 338 due to the current flowing in the diode 338 and the resistor 339 is applied to the transistor 33.

In the third exemplary embodiment, the diode 338 and the resistor 339 correspond to a first changing member. In addition, in FIG. 9, the same reference numerals and signs used in FIG. 1 are given to elements which are the same as those of FIG. 1, and detailed description is omitted.

Figure 10:
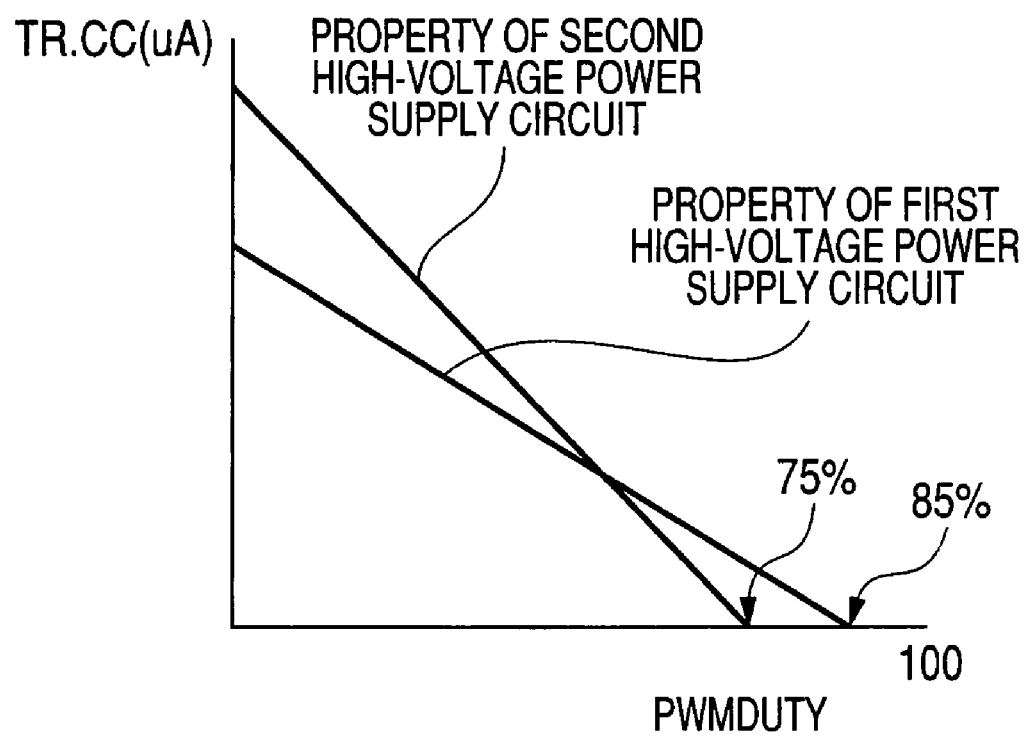
FIG. 10 is a graph illustrating a difference between the first version and the second version according to the third exemplary embodiment.

As shown in FIG. 10, in the high-voltage power supply circuit 11 of the first version, the transfer bias current TR.CC is applied after ON of the transistor 33 when the PWMDUTY is reduced up to about 85%. In contrast, in the high-voltage power supply circuit 311 of the second version, the transfer bias current TR.CC is not applied as long as the PWMDUTY is not reduced up to about 75%. Accordingly, the ASIC 3 determines a version of the high-voltage power supply circuit 11 or 311 coupled to the ASIC 3 in the following manner, and performs a feedback control process on the basis of the determination result.

Figure 11:
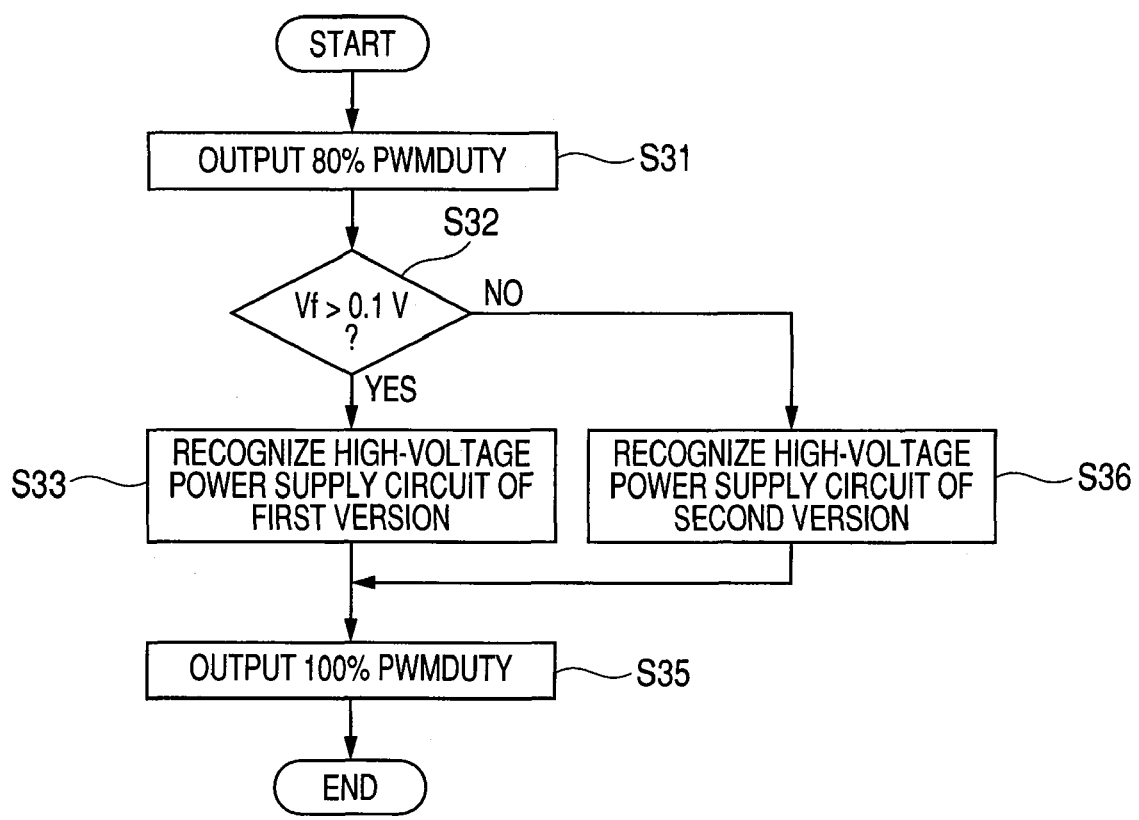
FIG. 11 is a flowchart illustrating a version determination process according to the third exemplary embodiment.

FIG. 11 is a flowchart illustrating a version determination process performed by the ASIC 3 according to the third exemplary embodiment. As shown in FIG. 11, at operation S31 of the version determination process, the PWM signal of an 80% PWMDUTY is output. In response to the PWM signal, the transfer bias current TR.CC is output if the circuit coupled to the ASIC 3 is the high-voltage power supply circuit 11. In contrast, the transfer bias current TR.CC is not output if the circuit coupled to the ASIC 3 is the high-voltage power supply circuit 311.

At operation S32, it is determined whether the feedback voltage Vf input to the A/D port exceeds about 0.1 V. If it is determined that the feedback voltage Vf>about 0.1 V (S32: Y), the circuit coupled to the ASIC 3 is identified as the high-voltage power supply circuit 11 of the first version at operation S33, and the process proceeds to operation S35. At operation S35, the PWM signal of the 100% PWMDUTY is again output and the process ends for the moment. Then, the PWMDUTY is adjusted so as to have an appropriate value in accordance with the feedback control process described above.

Alternatively, if it is determined that the feedback voltage Vf≦about 0.1 V (S32: N), the circuit coupled to the ASIC 3 is identified as the high-voltage power supply circuit 311 of the second version at operation S36, and the process proceeds to S35 described above.

In the third exemplary embodiment, the version of the high-voltage power supply circuit 11 or 311 is determined on the basis of the feedback voltage Vf upon outputting the PWM signal of the 80% PWMDUTY. Accordingly, the version can be determined without a complicated configuration, since it is not necessary to further provide a communication port or the like. Moreover, it is possible to further simplify the circuit configuration and easily manufacture the circuit, since the version determination process described above can be performed depending on the configuration in which the diode 338 and the resistor 339 are provided or not in the high-voltage power supply circuit 11 or 311. Furthermore, it is possible to suppress an influence of the version determined process on a circumferential configuration of the high-voltage power supply circuit 11 or 311, since the output becomes 0 μA upon outputting the PWM signal of the 80% PWMDUTY in the high-voltage power supply circuit 311 and the output is very small even in the high-voltage power supply 11, as shown in FIG. 10.

Other Exemplary Embodiments

The invention is not limited to the above-described exemplary embodiments, but may be modified in various forms without departing the gist of the invention. For example, in the above-described embodiments, slope directions (right upward or left downward) in the high-voltage power supplies of the second version and the first version are the same in the graphs shown in FIGS. 3, 7, and 10. However, the slope directions may be different from each other. However, when the slope directions are the same as each other, reducing the outputs is easy in both the high-voltage power supplies upon performing the version determination process. Accordingly, it is possible to easily suppress the influence of the respective high-voltage power supply circuits on the configuration of other circuits.

Additionally, in the above-described exemplary embodiments, a 24 V DC power supply and a 3.3.V DC power supply are described. However, the present invention is not limited to this, and the power supply values may be any values as long as one power supply is of a higher value than the other such that the power supplies may be discriminated.

Moreover, the invention may be applied to other processes as well as the feedback control process of the above-described power supply device. For example, when the primary winding of the transformer 20 is substituted by a heater and the secondary winding is substituted by a thermistor, the invention can be applied to a feedback control process for temperature.

Moreover, in the above described exemplary embodiments, the high-voltage powers supplies were described as being coupled to an ASIC. However, it is also possible to use a device other than and ASIC for determining the version of the coupled circuit. For example, a computer may be used, or an alternative control device.

As described above, a feedback control device according to an exemplary embodiment includes a controlled-system which performs outputting in correspondence with an input control signal; a feedback signal generating unit which generates a feedback signal corresponding to the output of the controlled-system; a reference signal inputting unit which inputs a reference control signal to the controlled-system; and a determination unit which determines a version of the controlled-system on the basis of the feedback signal generated by the feedback signal generating unit when the reference signal inputting unit inputs the reference control signal to the controlled-system.

In the feedback control device having the above-described configuration, the controlled-system performs the outputting in correspondence with the input control signal and the feedback signal generating unit generates the feedback signal corresponding to the output of the controlled-system. Accordingly, it is possible to perform a feedback control process for the controlled-system by inputting the control signal to the controlled-system on the basis of the feedback signal generated by the feedback signal generating unit.

According to the feedback control device having the above-described configuration, the reference signal inputting unit inputs the reference control signal to the controlled-system. The determination unit determines the version of the controlled-system on the basis of the feedback signal generated by the feedback signal generating unit when the inputting is performed. In this way, since the feedback control device determines the version of the controlled-system on the basis of the feedback signal, it is not necessary to further provide a communication port or the like. Accordingly, it is possible to determine the version without using a complicated configuration.

The feedback control device having the above-described configuration is not limited to the following configuration. The controlled-system may be a power supply device which outputs voltage or current corresponding to the control signal.

The reference control signal may be a control signal corresponding to a state where the outputting of the controlled-system is not performed, when the controlled-system is a specific version. With such a configuration, when the controlled-system is the specific version, the controlled-system does not perform the outputting upon inputting the reference control signal. Accordingly, it is possible to prevent the process of determining the version from affecting a configuration of other circuits in the controlled-system.

The directions of increase and decrease of the output with respect to increase and decrease of the control signal may be the same in the controlled-system of the first version and the controlled-system of second version. With such a configuration, even when the controlled-system is the first version, the increase and decrease directions with respect to the increase and decrease of the control signal is the same one another. Accordingly, the output corresponding to the reference control signal is also reduced even when the controlled-system is the second version. As a result, it is possible to further prevent the process of determining the version from affecting the configuration of other circuits of the controlled-system.

According to the feedback control device having the above-described configuration, the controlled-system may include a first changing unit which allows a correspondence relationship between the control signal and the output to be different from that of the controlled-system of the another version. With such a configuration, by providing the first changing member with the controlled-system, the feedback signal with respect to the reference control signal can be allowed to be different in every version. Accordingly, it is possible to further simplify the configuration and more easily manufacture the feedback control device.

According to the feedback control device having the above-described configuration, the feedback signal generating unit may include a second changing unit which allows the correspondence relationship between the control signal and the output to be different from that of the controlled-system of the second version. With such a configuration, by providing the second changing member with the feedback signal generating unit, the feedback signal with respect to the reference control signal can be allowed to be different. Accordingly, it is possible to further simplify the configuration and more easily manufacture the feedback control device.

The feedback control device having the above-described configuration may further include feedback control unit which inputs the control signal to the controlled-system on the basis of the versions of the controlled-system determined by the determination unit and the feedback signal generated by the feedback signal generating unit. With such a configuration, the feedback control unit inputs the control signal to the controlled-system on the basis of the version the feedback signal. Accordingly, it is possible to easily perform the feedback control process in consideration of the version of the controlled-system.

While the present invention has been shown and described with reference to certain exemplary embodiments thereof, it will be understood by those skilled in the art that various changes inform and details maybe made therein without departing from the spirit and scope of the invention as defined by the appended claims.

What is claimed is:

1. A feedback control device comprising:
    a controlled-system comprising:
        a control signal receiving member configured to receive a reference control signal,
        a feedback signal generating member configured to generate a feedback signal, and
        an output member configured to output an output in correspondence with the reference control signal; and
    a controller configured to control the controlled system comprising:
        a reference signal unit configured to output the reference control signal to the control signal receiving member;
        a feedback signal receiving member configured to receive the feedback signal from the feedback signal generating member; and
    a determination unit configured to determine a type of the controlled-system on the basis of the feedback signal received by the feedback signal receiving member, wherein the reference signal unit is configured to output the reference control signal to the control signal receiving member based on the determined type.

2. The feedback control device according to claim 1, wherein the controlled-system is a power supply device which outputs voltage or current in accordance with the control signal.

3. The feedback control device according to claim 1, wherein the reference control signal is a control signal corresponding to a state in which the outputting of the controlled-system is not performed, in a case in which the controlled-system is a specific type.

4. The feedback control device according to claim 3, wherein increase and decrease directions of the output with respect to increase and decrease of the reference control signal are the same in a controlled-system of a first type and a controlled-system of a second type.

5. The feedback control device according to claim 1, wherein the controlled-system is configurable into either a first type or a second type, and
    the controlled-system comprises a first changing unit which allows a correspondence relationship between the control signal and the output of the first type of the controlled-system to be different from that of the second type of the controlled-system.

6. The feedback control device according to claim 1, wherein the controlled-system is configurable into either a first type or a second type, and
    the feedback signal generating member comprises a second changing unit which allows the correspondence relationship between the control signal and the output of the first type of the controlled-system to be different from that of the second type of the controlled-system.

7. The feedback control device according to claim 1, further comprising:
    a feedback control unit which provides the control signal to the controlled-system, on the basis of the type of the controlled-system determined by the determination unit and the feedback signal generated by the feedback signal generating member.

8. A feedback system comprising:
    a high voltage board comprising:
        a high voltage power supply circuit which generates a high voltage output;
        a feedback signal generating circuit which generates a feedback signal; and
        a driving voltage control circuit which controls the high voltage output based on a control signal; and
    a control board comprising:
        a pulse width modulation circuit which outputs a PWM signal as the control signal;
        an analog-to-digital circuit which receives the feedback signal; and
    a determination unit which determines a type of the high voltage board in accordance with the feedback signal.

9. The feedback system according to claim 8, wherein the control board changes a parameter for feedback control in accordance with the type of the high voltage board.

10. A method of determining a type of a controlled-system, the controlled-system being configurable into a first type comprising a first feedback circuit which outputs a first feedback signal, or a second type comprising a second feedback circuit which outputs a second feedback signal, the method comprising:
  outputting a control signal to the controlled-system;
  in response to the control signal, receiving either the first feedback signal or the second feedback signal from the controlled-system;
  determining a type of the controlled-system based on whether the first feedback signal or the second feedback signal is received from the controlled-system; and
  controlling the controlled-system based on the determined type of the controlled-system.

11. The method according to claim 10, further comprising:
  changing a parameter for feedback control in accordance with the determined type of the controlled-system.

* * * * *